(12) United States Patent
Martineau et al.

(10) Patent No.: US 7,836,402 B2
(45) Date of Patent: Nov. 16, 2010

(54) MULTIPLE LINK CONNECTOR LIST

(75) Inventors: Terrence Martineau, Ottawa (CA);
David Kiesekamp, Ottawa (CA);
Raymond Canton, Ottawa (CA)

(73) Assignee: Alcatel Lucent, Paris (FR)

( * ) Notice: Subject to any disclaimer, the term of this patent is extended or adjusted under 35 U.S.C. 154(b) by 994 days.

(21) Appl. No.: 10/825,172

(22) Filed: Apr. 16, 2004

(65) Prior Publication Data
US 2005/0235227 A1   Oct. 20, 2005

(51) Int. Cl.
*G06F 15/177* (2006.01)
(52) U.S. Cl. .................. 715/734; 715/733; 715/737; 715/853; 715/854; 715/855
(58) Field of Classification Search .............. 715/734
See application file for complete search history.

(56) References Cited

U.S. PATENT DOCUMENTS

| | | | | |
|---|---|---|---|---|
| 5,751,965 | A * | 5/1998 | Mayo et al. ............... | 709/224 |
| 5,848,243 | A * | 12/1998 | Kulkarni et al. ............ | 709/224 |
| 5,910,803 | A * | 6/1999 | Grau et al. ................ | 715/734 |
| 5,953,347 | A * | 9/1999 | Wong et al. ............... | 370/469 |
| 6,101,498 | A * | 8/2000 | Scaer et al. ............... | 707/10 |
| 6,154,220 | A * | 11/2000 | Prakriya et al. ............ | 345/440 |
| 6,225,999 | B1 * | 5/2001 | Jain et al. ................ | 715/734 |
| 6,237,006 | B1 * | 5/2001 | Weinberg et al. ....... | 707/103 R |
| 6,714,936 | B1 * | 3/2004 | Nevin, III ................ | 707/102 |
| 6,836,275 | B1 * | 12/2004 | Arquie et al. ............ | 715/734 |
| 6,897,885 | B1 * | 5/2005 | Hao et al. ................ | 715/853 |
| 6,901,433 | B2 * | 5/2005 | San Andres et al. ........ | 709/216 |
| 7,158,488 | B2 * | 1/2007 | Fujimori .................. | 370/312 |
| 7,315,985 | B1 * | 1/2008 | Gauvin et al. ............ | 715/734 |
| 2005/0229113 | A1 * | 10/2005 | Martineau et al. ......... | 715/822 |

OTHER PUBLICATIONS

Hewlett-Packard, "Managing Your Network with HP OpenView Network Node Manager", May 2002, Hewlett-Packard Company, pp. 45, 48-52, 62, 63, 93, 94, 104, 105, 117, 118, 130, 131, 201-203, 205-209, 211, 212, 237, 239, 242, 281, 284, 288, 289, http://ovweb.external.hp.com/ovnsmdps/pdf/j1240-90080.pdf.*
Hewlett-Packard Company, "Managing Your Network with HP OpenView Network Node Manager", May 2002, Hewlett-Packard Company, J1240-90080, pp. 45, 48-52, 62, 63, 93, 94, 104, 105, 117, 118, 130, 131, 201-203, 205-209, 211, 212, 237, 239, 242, 281, 284, 288, 289.*

* cited by examiner

*Primary Examiner*—Alvin H Tan
*Assistant Examiner*—Tadesse Hailu
(74) *Attorney, Agent, or Firm*—Kramer & Amado P.C.

(57) ABSTRACT

A comprehensive network map for a graphical user interface (GUI) of a communication network, illustrates all outside links to network devices external to said map. To this end, the connections between a network device on the map and all groups of network devices outside of the map are illustrated using an interactive multiple link connector icon associated to the network device. The connector icon comprises a button for enabling display of a multiple link connector (MLC) list. Each row of the MLC list comprises an outside link widget associated with a group identification widget. A list with all connection between the network device and an associated group of outside network devices is displayed on the map upon selection of the outside link widget on the MLC list. Furthermore, a sub-map of a group is displayed upon selection of the respective group identification widget.

13 Claims, 3 Drawing Sheets

US 7,836,402 B2

MULTIPLE LINK CONNECTOR LIST

FIELD OF THE INVENTION

The invention is directed to management of communication networks and in particular to a multiple link connector list for display on the graphical user interface (GUI) of such networks.

BACKGROUND OF THE INVENTION

Modern management systems provide fully integrated network management for various technologies such as LAN, TDM, Frame Relay, ATM and IP, using a rich graphical user interface (GUI). A GUI (graphical user interface) uses object oriented programming techniques to present the information to the network operator for visual inspection, typically using interactive windows. The GUI selects the information to be presented in a window in accordance with a respective request in the context of network management and service provisioning capabilities of the network. The operators monitor and control the display of information on a video terminal (workstation) and the GUI enables the network management system (NMS) to receive, reject, accept and respond to the requested actions.

Each window uses basic displayable elements and controls (widgets), such as icons, pull-down menus, buttons, selection boxes, progress indicators, on-off checkmarks, scroll bars, window frames, window manipulators, etc. Examples of GUI windows are topology maps providing graphical representations of the network, where basic icons are displayed for each network object. Information about the state of the objects on the map is generally conveyed by outlining the icons using solid, colored, dashed, tri-dimensional representations. Equally important, the maps also show the connections between the icons representing the network elements.

Often a GUI map must display connections to network elements (NE's) that are not part of a currently displayed map. For example, the topology maps displayed by Alcatel's network management 5620 NM show connectivity outside of the currently displayed map with arrows originating at the respective NE's or NE group on the map, and identify the names of groups that contain NE's with which they are connected, at the tip of the arrows. Often, an NE or a group is the origin over 50 arrows, making the map very cluttered. As the arrows cannot be moved, they often overlap and are not distinctly visible. As a result, the users are not able to 'point and click' a desired connection for selecting it.

The operators need to be provided with a simple way to identify the nodes outside the currently displayed map that are connected to the NE's or groups in their respective map, for easy, user-friendly problem analysis and resolution. Therefore, a way to display this information, without cluttering the respective map is highly desirable.

In addition, in many cases the users wish to access the NE's that are outside the node group shown on the current map. When the user wants to access such outside NE's, s/he must list them or use a 'Find node' command. Therefore, there is also a need to provide a more efficient way to access the nodes outside of the node group shown on the current map.

Connectors on network topology maps such as the map provided by Alcatel network management system 5620 NM are just a label, and clicking on such a connector does not allow users to go to the location displayed on the label. Still other NMS's enable viewing another group map by clicking on a connector, but the group map the connector leads to needs to be manually configured. Often, network connectivity is not point to point but could span many NE's which may be in many different groups. Users would like to check all devices associated with such multi-hop connections. Being able to follow these connections from device to device without regard to which group the various associated devices are in, and without having to set the group maps for each connector manually, is a very valuable feature.

SUMMARY OF THE INVENTION

It is an object of the invention to provide a GUI with the ability to display on a current network topology map a multiple link connector list that identifies all the links connecting the displayed NE's and groups with far endpoints outside of the current map, and their status.

Accordingly, the invention provides a method of displaying all links connecting a network device with network devices outside a map currently presented on a graphical user interface (GUI) of a communication network, comprising: a) collecting data for all objects to be displayed on the map in response to a request transmitted over the GUI; b) bundling all connections between the network device and a group of network devices outside the map into an outside link; c) grouping all outside links for the network device into a multiple link connector (MLC) object and associating the MLC object with an interactive connector icon; and d) displaying the map showing the interactive connector icon attached to the network device.

The invention is also directed to a modified graphical user interface (GUI) of the type adapted to transmit commands and display information with a view to enable management of a communication network, comprising: means for collecting map data for a network device to be displayed on a map of interest; means for bundling all connections between the network device and a group of outside network devices external to the map into an outside link, and maintaining a connections list L(n) for each outside link; and means for grouping all outside links for the network device into a multiple link connector (MLC) and associating the MLC with an interactive connector icon, wherein the interactive connector icon is displayed on the map attached to the network device.

According to still another aspect of the invention, a method of using a modified graphical user interface (GUI) adapted to reduce the cluttering of icons on a map of interest is provided. The method comprises: a) whenever a network device is connected to more than one outside network device of a group of outside network devices external to the map, displaying an outside link connecting the network device with the group using an interactive multiple link connector icon; and b) selecting the multiple link connector icon on the map to obtain a multiple link connector list, displaying an interactive outside link widget associated with an interactive group identification widget for each group of outside network devices connected to the network device.

In addition, the invention is directed to a comprehensive network map for a GUI of a communication network, illustrating all outside links to groups of network devices external to the map, comprising: a network device icon, illustrating a network device in the context of the map; and an interactive multiple link connector icon associated to the network device, representing all outside links between the network device and all groups of outside network devices connected to the network device.

Advantageously, the invention enables the users to readily view the entire list of linkages of the NE's and groups displayed on a GUI map and their status. This feature becomes especially important as network nodes become highly interconnected. By automatically creating composite connectors, map clutter is significantly reduced, providing the user with a better view of the network and with the ability to take better and faster corrective actions.

The multiple link connector list according to the invention also enables a user to view the links going outside of the current map, or the corresponding network element group. This saves an operator time when navigating network maps. Furthermore, automatically creating composite connectors saves an operator the time and effort of manually reducing map clutter.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
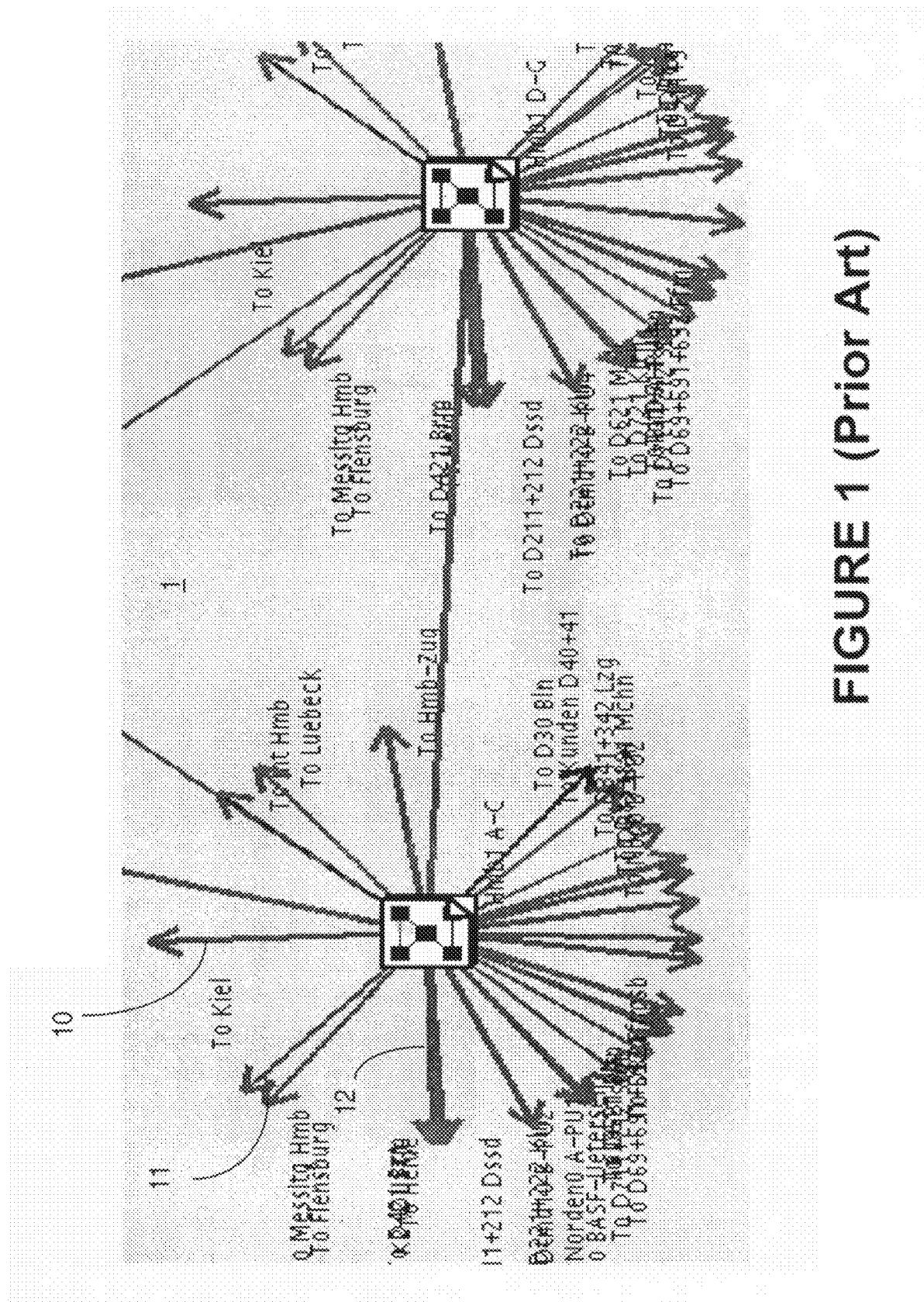
FIG. 1 illustrates an example of a current GUI map where the connectivity to nodes outside the map is shown with arrows (prior art)

FIG. 1 illustrates an example of a GUI map 1 showing two network groups identified as "Hmb1 A-C" and "Hmb1 D-C". Each device on map 1 is heavily connected to a plurality of network devices outside map 1. These links are shown by arrows.

Due to the large number of connections to outside NE's, most of the information about the links shown by arrows is useless, in that it cannot be readily read. Thus, while the identification of links such as links 10 and 11 is clear on map 1 ("to Kiel", and "to Flensburg" respectively), the identification of link(s) as these shown at 12 is unclear. This is because there are two or more overlapping arrows, and correspondingly, two or more overlapping link identifications. As the operator cannot move the arrows, s/he cannot distinguish the link identification, and also s/he is not able to 'point and click' a desired connection for selecting one of the overlapping links.

In addition, the operator cannot access an NE that is outside the node group shown on the current map to further investigate the condition/state of that connection. When the user wants to access NE's outside the map, s/he must list them, or use a 'Find node' command.

Figure 2:
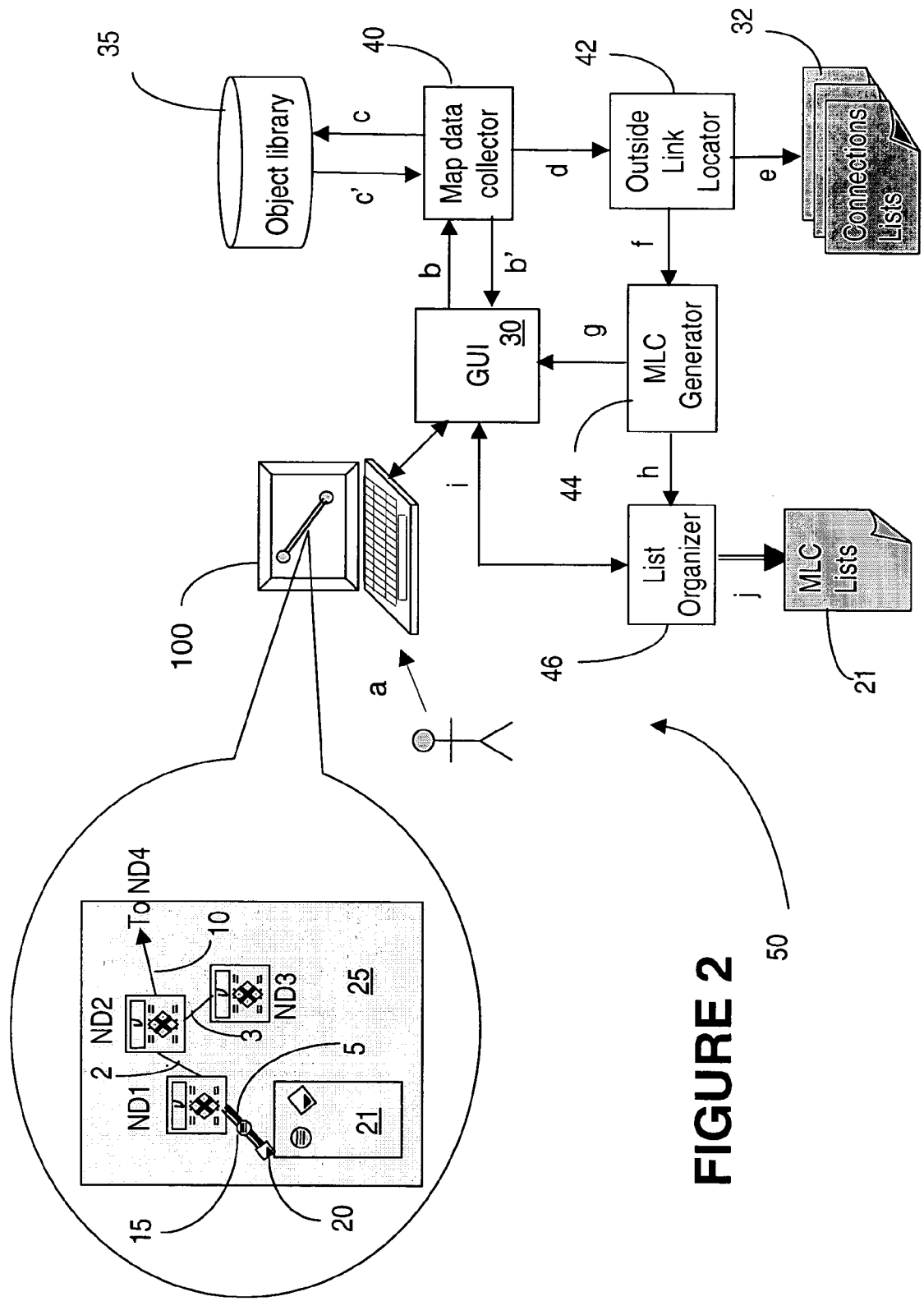
FIG. 2 is a block diagram of a multiple link connector-enabled GUI according to the invention.

FIG. 2 illustrates a block diagram of a multiple link connector-enabled GUI 50, also called here a "modified GUI", illustrating specifically the units that enable generation of a window 25 according to the invention. A GUI unit 30 performs conventional user interface functions enabling an operator to monitor and manage the network, as well known. For the example used in this specification, GUI unit 30 provides an operator with a map of interest 25, which is displayed on the screen of a workstation 100. Also, GUI unit 30 enables the operator to perform various operations by using the widgets provided in the respective window by performing typical "point-and click" operations.

A simple map 25 has been provided for clarity; normally a map shows multiple network devices and their interconnection at the respective hierarchical level. Thus, there could be maps representing a part of a network at the network node level, or at the shelf, slots, cards, ports, etc. levels. Each node could be in a group that could be inside another group, inside another group, etc. The term "network device" or "network element" is intended to generically designate any physical or logical entity of the network (managed object). The term "group' refers to a logical grouping of network devices.

Map 25 shows in this example three network device icons ND1, ND2 and ND3, link icons 2 and 3 between the devices within the map, and a link icon 10 illustrating a single connection from ND2 to an outside node ND4 (not shown). The network devices are routers here, but they could be any other objects at the hierarchical level of the respective map.

Map 25 also shows a multiple link connector 5, which indicates to the operator that ND1 is connected directly to more than one network device outside map 25. To summarize, a multiple link connector 5 represents according to the invention all outside links established between a network device on the current map and all node group outside the map. The term "outside link" designates all connections between a network device on the current map to a group of network devices outside the map. As such, an outside link to a specified outside group may include a plurality of connections between the network device on the map and the respective outside network devices of the group. The term "outside network device" or "outside group" is used to designate generically any network element, (router, switch, shelf, card, etc) or group of NE's, which is outside the map currently shown by the GUI, but directly connected (linked) with a network device on that current map.

By using this new representation of the outside links, all links that connect outside network devices to the first network device Hmb1 A-C shown on map 1 of FIG. 1 could be shown according to the invention using one connector 5, thereby reducing cluttering of map 1.

The connector object 5 is illustrated using a line 15 originating at the respective network device (here ND1) and ending with a button 20. By selecting button 20, a pop-up window 21 (described later in connection with FIG. 3) provides the operator with information on the outside links and devices that are linked to the network devices on the current map. Of course, other icons may be used to designate these objects; what is relevant here is the functionality that this new object (a multiple link connector) enables.

As shown on FIG. 2, GUI unit 30 uses a map data collector unit 40 for accessing an object library 35 with a view to selecting data pertinent to a certain object to be displayed on the map. In this way, GUI unit 30 constructs maps and various dialog boxes necessary for enabling the operator to transmit commands and receive information about operation and status of the network.

In general, all nodes maintain an object library that comprises data pertinent to the network elements at the respective node, available for use by various network management applications, including the GUI. The information about the ports used by a specified connection is also available at the node; if this information is not readily available, it may be imported from the routing database. It is to be mentioned that the location of the device specifications or the way this information is stored at the node is not relevant to the invention; relevant is the availability of this information.

Modified GUI 50 also comprises an outside link locator 42 for determining which links on the current map connect a certain network device within the map with outside groups. This determination is performed on the information collected by the GUI unit 30 for the current map. Outside link locator 42 also prepares a connections list L(n) including all n outside connection directly connecting a network device with network devices of a specified group of network devices outside the map. The individual connections are associated in the list with the respective outside network device. These lists, denoted with 32 on FIG. 2, are prepared for each outside device linked with a network device resident on the map. If a network device has only one outside link, such as ND2 in the example of FIG. 2, the modified GUI 50 illustrates these single links as before, with arrows 10 (or similar means), also providing the outside network device identification at the tip of the arrow.

Based on the connection grouping information assembled by locator 42, a multiple link connector (MLC) generator unit 44 creates the multiple link connector (MLC) object by grouping all outside links for the respective network device shown on the map, and associating an interactive MLC icon 5 to the connector. Icon 5 is also associated with all appropriate lists 32 pertinent to the respective network device.

Based on the outside link grouping information assembled by MLC generator 44, a list organizing unit 46 generates a multiple link connector list (MLCL) which is displayed in window 21 (please note that MLCL and the pop-up window associated to button 20 are both referred by numeral 21). List organizer 46 enables the operator to select an object of interest on list 21, by "a point-and click" operation performed on button 20 to open list 21, and then to select the objects of list 21 for obtaining further details on linkage information, as described later in connection with FIG. 3.

For example, let's assume that ND1 is directly connected to seven node groups (as e.g. shown in the example of FIG. 3), by seven respective outside links. Let's also assume that only five outside links have multiple connections to the respective outside device. In this case, multiple link connector icon 5 is associated to the network device ND1, and with five lists L(n), each maintaining the connections between ND1 and the respective outside device. The pop-up menu 21 lists all seven outside links in connector 5 and the corresponding network devices outside of the map.

Arrows a-i show the sequence of operations for obtaining window 25. As shown by arrow a, the operator requests a map 25, specifying on the workstation 100 the parameters for this map, as well know. GUI 30 instructs the map data collector 40 to collect the information necessary to show the map, arrow b. Unit 40 consults object library 35 to collect the data pertinent to the requested map, as shown by arrow c. As the network objects of the map are acquired, arrow c', they are returned to the GUI, arrow b', for display on terminal 100. At the same time, outside link locator 42 determines which outside connections should be included in list 21, as shown by arrow d. As the outside connections to each outside group and the identification of the respective groups are uncovered, they are placed in a respective list 32, as shown by arrow e.

As shown by arrows f and g, connector generator 44 prepares the respective connector object 5 by grouping all outside links for the respective network device (here ND1), and provides same to GUI 30 for display on window 25. List organizer 46 in turn prepares the multiple link connector list 21 providing the association between the outside links from a certain network device resident on the current map and the groups to which these links are directed, arrow j. Once the map 25 with all objects requested, including connector objects 5 is displayed, the operator may open pop-up window 21 for a network device of interest, arrow i, by selecting button 20. The operator may further select an outside link or an outside node group on list 21; these operations are shown by arrow j.

Figure 3:
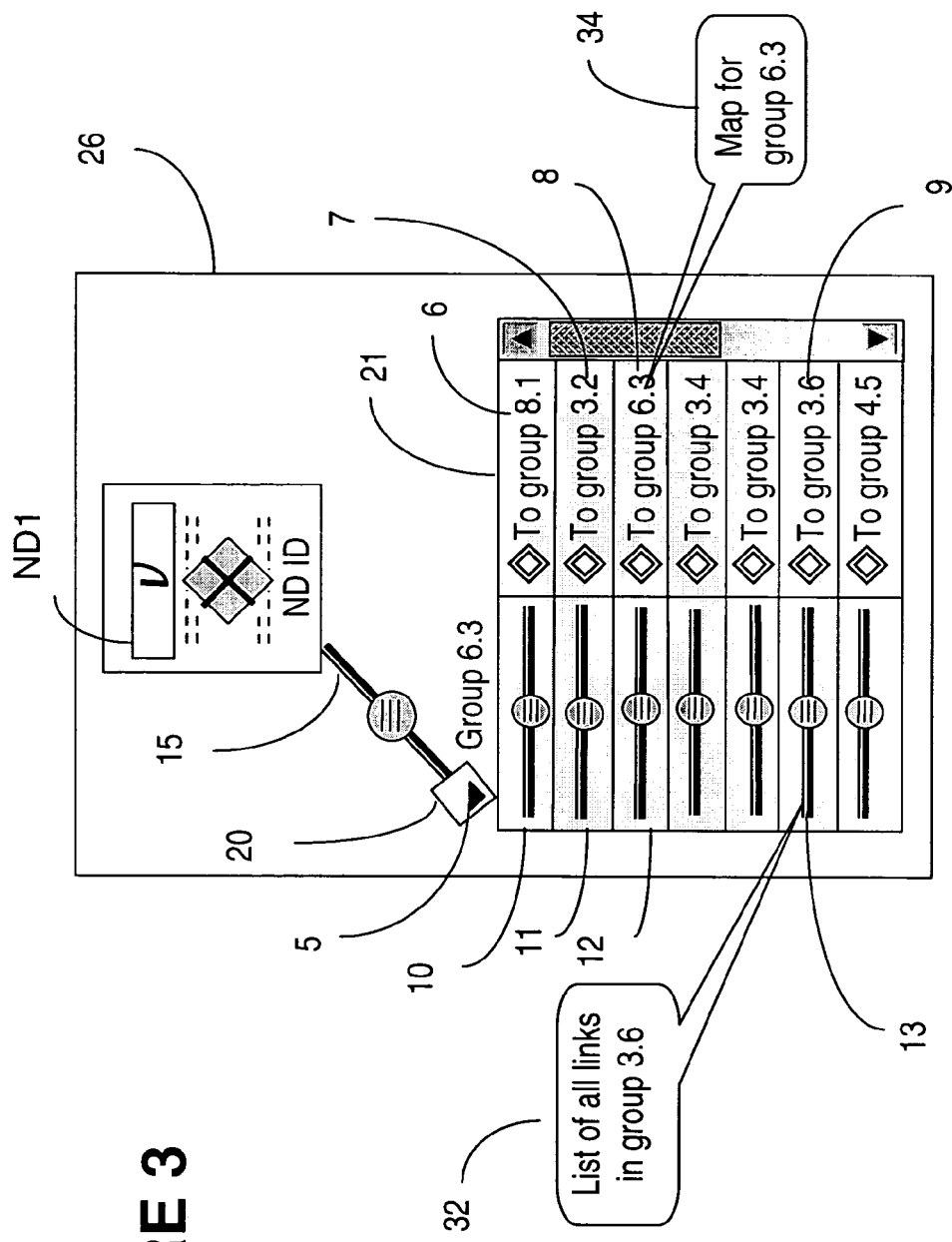
FIG. 3 is a window showing an example of a multiple link connector list according to the invention.

FIG. 3 illustrates a preferred look of a window 26, also illustrating a multiple link connector list 21 according to the invention. In this example, list 21 is again associated with network device ND1. Multiple Link connector icon 5 indicates that ND1 is directly connected to a plurality of outside network devices, and the identification of the outside links and devices can be viewed by selecting button 20. In this example the left column of list 21 shows all the outside links 10, 11, 12, 13, etc. and in the right column, shows the corresponding groups of network devices 6, 7, 8, 9.

Clicking on an outside link of the pop-up menu 21 opens up a link list 32 with all connections (links) bundled in that outside link. For example, clicking on icon 13 will provide the appropriate list 32 of all connections between network device ND1 and the network devices 9 in node group 3.6, listed on the same row with connector 13.

Clicking on an outside node group in list 21, opens up a map 34 with the network devices in the corresponding node group. For example, clicking on icon 8 will provide the map 34 for group 6.3.

It should be apparent from the foregoing description that various exemplary embodiments of the invention may be implemented in hardware and/or firmware. Furthermore, various exemplary embodiments may be implemented as instructions stored on a computer-readable storage medium, which may be read and executed by at least one processor to perform the operations described in detail herein.

We claim:

1. A method of displaying all direct connections between a subject node and outside nodes not displayed on a map currently presented on a graphical user interface (GUI) of a communication network, wherein each of said outside nodes is associated with at least one of a plurality of outside node groups, the method comprising:

bundling, for each of said plurality of outside node groups, said direct connections between said subject node and said outside nodes belonging to said outside node group to create an outside link bundle;

grouping said outside link bundles into a multiple link connector (MLC) object and associating an interactive connector icon with said MLC object;

displaying said interactive connector icon on said map, wherein said interactive connector icon is attached to said subject node; and displaying, responsive to selecting said interactive connector icon, a pop-up window showing a multiple link connector (MLC) list wherein each row in said MLC list shows an association between one of the outside link bundles and a corresponding one of the outside node groups, each outside link bundle comprising one or more direct connections.

2. The method of claim 1, wherein:

said MLC list displays in each row an interactive outside link widget associated with a respective interactive group identification widget, each interactive outside link widget is associated with one of said outside link bundles, and each interactive group identification widget is associated with a respective one of said outside node groups.

3. The method of claim 2, further comprising:

selecting said interactive outside link widget on said MLC list to display a connections list L(n) identifying all direct connections bundled within said outside link bundle.

4. The method of claim 2, further comprising:

selecting said respective interactive group identification widget on said multiple link connector list to display a sub-map of said network showing said one of said outside node groups.

5. The method of claim 1, wherein at least one of said plurality of outside node groups is associated with only one outside node.

6. A method of using a modified graphical user interface (GUI) adapted to reduce the cluttering of icons on a map of interest, the method comprising:

whenever a network device has direct connections to a plurality of groups of outside network devices external to said map, bundling said direct connections between said network device and each of said plurality of groups of outside network devices external to said map into an outside link bundle;

grouping said outside link bundles for said network device into a multiple link connector (MLC);

associating an MLC icon with said MLC, wherein said MLC icon is displayed on said map and is attached to said network device;

selecting said MLC icon on said map to obtain a multiple link connector (MLC) list, each row of said MLC list showing an association between one of said outside link bundles and a respective one of said plurality of groups of outside network devices, each outside link bundle comprising one or more direct connections, wherein each said outside link bundle is displayed on said MLC list using an interactive outside link widget and each said group of outside network devices associated with said respective outside link bundle is displayed using an interactive group identification widget.

7. The method of claim 6, further comprising:

selecting said interactive outside link widget for said associated outside link bundle to obtain a list L(n) with all direct connections contained in said associated outside link bundle.

8. The method of claim 6, further comprising:

selecting said interactive group identification widget on said multiple link connector list to display a sub-map of all network devices in said associated group.

9. The method of claim 6, wherein at least one of said groups of outside network devices is associated with only one outside network device.

10. A computer-readable storage medium encoded with instructions for a GUI of a communication network embodying a comprehensive network map illustrating all outside link bundles to a plurality of network devices external to said map, comprising:

a network device icon, illustrating a network device in a context of said map;

an interactive multiple link connector (MLC) icon associated with said network device, representing all outside link bundles between said network device and all groups of outside network devices directly connected to the network device, wherein said MLC icon comprises a button for enabling display of a multiple link connector (MLC) list; and a pop-up window displaying said MLC list responsive to selecting said button, wherein each row in said MLC list displays an association between one of said outside link bundles and one of said groups of outside network devices to which said network device connects, each of said one of said outside link bundles comprising a plurality of direct connections between the network device and a respective one of said groups of outside network devices.

11. The computer-readable storage medium of claim 10, wherein each row of said multiple link connector list comprises an outside link widget associated with a group identification widget.

12. The computer-readable storage medium of claim 11, further comprising:

a list with all direct connections between said network device and one of said groups, the list displayed on said map upon selection of one of said outside link widgets.

13. The computer-readable storage medium of claim 11, further comprising:

a sub-map of one of said groups displayed on said map upon selection of one of said group identification widgets.

* * * * *